(12) United States Patent
Song et al.

(10) Patent No.: US 12,427,001 B2
(45) Date of Patent: Sep. 30, 2025

(54) APPARATUS AND METHOD FOR SETTING MARGIN LINE

(71) Applicant: MEDIT CORP., Seoul (KR)

(72) Inventors: Myoung Woo Song, Seoul (KR); Ho Taik Lee, Seongnam-si (KR)

(73) Assignee: MEDIT CORP., Seoul (KR)

( * ) Notice: Subject to any disclaimer, the term of this patent is extended or adjusted under 35 U.S.C. 154(b) by 577 days.

(21) Appl. No.: 17/855,638

(22) Filed: Jun. 30, 2022

(65) Prior Publication Data

US 2022/0331072 A1 Oct. 20, 2022

Related U.S. Application Data

(63) Continuation of application No. PCT/KR2020/019282, filed on Dec. 29, 2020.

(30) Foreign Application Priority Data

Dec. 30, 2019 (KR) .................. 10-2019-0177244

(51) Int. Cl.
*A61C 9/00* (2006.01)

(52) U.S. Cl.
CPC .................. *A61C 9/006* (2013.01)

(58) Field of Classification Search
CPC . A61C 9/0046; A61C 13/0004; A61C 13/082; A61C 9/006
USPC ........................................ 345/418
See application file for complete search history.

(56) References Cited

U.S. PATENT DOCUMENTS

| 11,678,953 B2* | 6/2023 | Kopelman | A61B 1/24 |
| | | | 382/154 |
| 2018/0153659 A1 | 6/2018 | Fisker et al. | |
| 2020/0197129 A1* | 6/2020 | Kopelman | A61B 1/24 |

(Continued)

FOREIGN PATENT DOCUMENTS

| JP | 2012-024396 A | 2/2012 |
| KR | 10-2010-0126700 A | 12/2010 |
| KR | 10-1295610 B1 | 8/2013 |

(Continued)

OTHER PUBLICATIONS

Ercoli C, Caton JG. Dental prostheses and tooth-related factors. Journal of periodontology. Jun. 2018;89:S223-36.*

(Continued)

*Primary Examiner* — Phu K Nguyen
(74) *Attorney, Agent, or Firm* — Insight Law Group, PLLC; Seung Lee

(57) ABSTRACT

Disclosed are an apparatus and method for setting a margin line and a recording medium, wherein the apparatus and method set a margin line corresponding to the outline of the boundary between a tooth and a prosthesis on the basis of three-dimensional virtual model data of the tooth obtained by using a three-dimensional scanner such as an oral scanner or the like. The method for setting a margin line according to an embodiment of the present disclosure, comprises the steps of: generating curve information about the peripheral area of the margin line candidate points selected in a three-dimensional virtual model obtained for a tooth; and setting a margin line indicating the outline of the boundary between the tooth and a prosthesis on the basis of the curve information.

15 Claims, 9 Drawing Sheets

(56) References Cited

U.S. PATENT DOCUMENTS

2021/0059796 A1* 3/2021 Weiss .................. G06N 3/08
2022/0331072 A1* 10/2022 Song .................. A61C 9/0046

FOREIGN PATENT DOCUMENTS

| KR | 10-1848188 B1 | 4/2018 |
| KR | 10-1888361 B1 | 9/2018 |
| KR | 10-1911693 B1 | 1/2019 |
| KR | 10-2019-0074062 A | 6/2019 |

OTHER PUBLICATIONS

Tsitrou EA, Northeast SE, van Noort R. Evaluation of the marginal fit of three margin designs of resin composite crowns using CAD/CAM. Journal of dentistry. Jan. 1, 2007;35(1):68-73.*
International Search Report mailed Jun. 2, 2021 for International Application No. PCT/KR2020/019282 and its English translation.
Non-final office action mailed Sep. 10, 2021 for Korean Application No. 10-2019-0177244.
Notice of Allowance mailed Apr. 25, 2022 for Korean Application No. 10-2019-0177244.

* cited by examiner

APPARATUS AND METHOD FOR SETTING MARGIN LINE

CROSS-REFERENCE TO RELATED APPLICATIONS

This application is a Continuation-In-Part application of International Application No. PCT/KR2020/019282, filed Dec. 29, 2020, which claims the benefit of Korean Patent Application No. 10-2019-0177244, filed Dec. 30, 2019 in the Korean Intellectual Property Office, the disclosures of which are incorporated herein in their entirety by reference.

TECHNICAL FIELD

The present disclosure relates to an apparatus and method for setting a margin line corresponding to the outline of a boundary between a tooth and a prosthesis based on three-dimensional virtual model data of a tooth acquired by a three-dimensional scanner such as an oral scanner.

BACKGROUND ART

A dental prosthesis manufacturing process includes a process of acquiring information about patient's teeth and manufacturing an accurate prosthesis based on the corresponding tooth information. Conventionally, a prosthesis such as a crown is manufactured based on a plaster by taking impressions on the teeth and gums using an impression material on the patient's teeth, and manufacturing the plaster after taking the impressions. However, in the conventional process, there is a difference in accuracy depending on the skill levels of the operators (dentists or dental workers), and there is a rejection reaction of the patient such as vomiting or discomfort in the process of inserting the impression material into the patient's oral cavity. In addition, since a long time and manual process from taking impressions to manufacturing the prosthesis are added, there are disadvantages in that costs are high and it takes a long time. Accordingly, in recent years, a method of acquiring a virtual model using an oral scanner and manufacturing a prosthesis using the acquired virtual model has been continuously developed. Various dental treatments and treatment plans may be established by using the oral scanner, and there are advantages such as cost and time savings, and reduction in the rejection reaction of the patient.

A process of manufacturing a prosthesis using a conventional virtual model is as follows. First, the operator performs preparation of the actual tooth for manufacturing the prosthesis. Next, a virtual model is acquired by measuring the prepared tooth and surrounding teeth through an oral scanner. Then, a margin line for the acquired virtual model is set, and a prosthesis is manufactured based on the tooth and the set margin line.

FIG. 1 is an exemplary view showing a margin corresponding to a boundary between a tooth and a prosthesis. A margin line means the outline of the margin. Since the margin is the boundary between the tooth and the prosthesis, it is important to accurately bond the tooth and the prosthesis based on the corresponding information when the tooth and the prosthesis are bonded. For accurate bonding, the preparation of the tooth should be round, and when the preparation of the tooth is irregular (bumpy), the margin of the prosthesis is also required to be manufactured irregularly. When the margin formation between the tooth and the prosthesis is not good, a gap (hole) may occur in the bonding process of the tooth and the prosthesis, so that there is a problem in that a bonding force between the two is weakened, and furthermore, saliva or impurities penetrate between the gap, resulting in caries.

SUMMARY OF INVENTION

Technical Problem

An object of the present disclosure is to provide an apparatus and method for setting a margin line that set a margin line corresponding to the outline of a boundary between a tooth and a prosthesis based on three-dimensional virtual model data of a tooth acquired by a three-dimensional scanner such as an oral scanner, and a recoding medium.

In addition, another object of the present disclosure is to provide an apparatus and method for setting a margin line, which may prevent a gap from occurring in a bonding process of a tooth and a prosthesis by setting an accurate margin line, increase a bonding force between the tooth and the prosthesis, and prevent caries from occurring due to penetration of saliva or impurities into a gap between the tooth and the prosthesis, and a recoding medium.

In addition, a still another object of the present disclosure is to provide an apparatus and method for setting a margin line, which may set a margin line more accurately by primarily generating margin line information by bending information of a tooth and a gum, and secondarily correcting the margin line using color information of a tooth and a gum, and a recoding medium.

Solution to Problem

A method for setting a margin line according to an embodiment of the present disclosure includes: generating curve information on a surrounding area of a margin line candidate point selected from a three-dimensional virtual model acquired for a tooth; and setting a margin line representing the outline of a boundary between the tooth and a prosthesis based on the curve information.

The setting of the margin line may include: generating a line corresponding to the outline of the tooth and the gum of the three-dimensional virtual model from the curve information; setting a color of the line using color information of the three-dimensional virtual model; and setting the margin line based on the curve information and the color of the line.

The setting of the color of the line may set the color of the line based on color information of points configuring a mesh of the three-dimensional virtual model or surfaces of the mesh.

The setting of the margin line may include: selecting a portion with the greatest curve in the surrounding area of the margin line candidate point as a curve point; and correcting the margin line by determining a margin point based on the curve point and the color information of the line representing the tooth and the gum.

The correcting of the margin line may include correcting a position of the margin point from the curve point to a position on a tooth line representing the tooth when the curve point is positioned on a gum line representing the gum.

The correcting of the margin line may include correcting the margin line by determining a point with the greatest curve on the tooth line as the margin point.

The setting of the margin line may include generating a line corresponding to the outline of the tooth and gum of the three-dimensional virtual model using the curve information and color information of the three-dimensional virtual model.

The method for setting the margin line according to an embodiment of the present disclosure may further include: displaying a generation/correction object for generating or correcting a preparation tooth of the three-dimensional virtual model and the margin line of the preparation tooth; converting the margin line into a state in which generation or correction is possible when the generation/correction object is selected; displaying a line representing curve information of a surrounding area of the margin point selected by an input unit together with the three-dimensional virtual model; moving a position of the margin point to the surrounding area on the margin line by the input unit; and correcting the margin line based on the moved position of the margin point.

The displaying of the line may include applying color information of the tooth and a gum to the curve information of the surrounding area of the margin point.

According to an embodiment of the present disclosure, there is provided a computer readable recording medium in which a program for executing the method for setting the margin line is recorded.

An apparatus for setting a margin line according to an embodiment of the present disclosure includes: a curve information generation unit configured to generate curve information for a surrounding area of a margin line candidate point selected from a three-dimensional virtual model acquired for a tooth; and a margin line setting unit configured to set a margin line representing the outline of a boundary between the tooth and a prosthesis based on the curve information.

The margin line setting unit may include: a line generation unit configured to generate a tooth line corresponding to a cross-sectional outline of the tooth of the three-dimensional virtual model from the curve information; a color setting unit configured to set a color of the tooth line using color information of the three-dimensional virtual model; and a setting unit configured to set the margin line based on the curve information and the color of the tooth line.

The color setting unit may set the color of the line based on color information of points configuring a mesh of the three-dimensional virtual model or surfaces of the mesh.

The setting unit may include: a curve point selection unit configured to select a portion with the greatest curve in the surrounding area of the margin line candidate point as a curve point; and a margin line correction unit configured to correct the margin line by determining a margin point based on the curve point and the color information of the line representing the tooth and the gum.

The margin line correction unit may correct a position of the margin point from the curve point to a position on a tooth line representing the tooth when the curve point is positioned on a gum line representing the gum.

The margin line correction unit may correct the margin line by determining a point with the greatest curve on the tooth line as the margin point.

The margin line setting unit may include a line generation unit configured to generate a line corresponding to the outline of the tooth and gum of the three-dimensional virtual model using the curve information and the color information of the three-dimensional virtual model.

The apparatus for setting the margin line according to an embodiment of the present disclosure may further include: a display unit configured to display a generation/correction object for generating or correcting a preparation tooth of the three-dimensional virtual model and a margin line of the preparation tooth; and an input unit provided to select the generation/correction object and the margin point on the margin line.

The curve information generation unit may generate a line representing curve information of a surrounding area of the margin point. The display unit may display the line representing the curve information of the surrounding area of the margin point together with the three-dimensional virtual model.

The margin line setting unit may convert the margin line to a state in which generation or correction is possible when the generation/correction object is selected, move a position of the margin point on the margin line to the surrounding area according to an operation of the input unit, and correct the margin line based on the moved position of the margin point.

The curve information generation unit may apply color information of the tooth and the gum to the curve information of the surrounding area of the margin point.

Advantageous Effects of Invention

According to the embodiment of the present disclosure, there are provided the apparatus and method for setting the margin line that set the margin line corresponding to the outline of the boundary between the tooth and the prosthesis based on the three-dimensional virtual model data of the tooth acquired by the three-dimensional scanner such as an oral scanner, and a recoding medium.

In addition, according to the embodiment of the present disclosure, it is possible to prevent the gap from occurring in the bonding process of the tooth and the prosthesis by setting the accurate margin line, increase the bonding force between the tooth and the prosthesis, and prevent caries from occurring due to penetration of saliva or impurities into the gap between the tooth and the prosthesis.

In addition, according to the embodiment of the present disclosure, it is possible to set the margin line more accurately by primarily generating the margin line information by bending information of the tooth and the gum, and secondarily correcting the margin line using the color information of the tooth and the gum.

DESCRIPTION OF EMBODIMENTS

Figure 1:
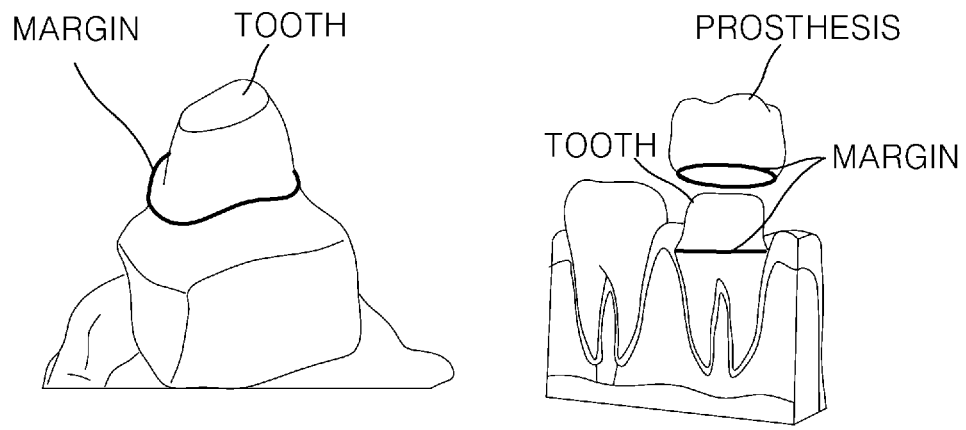
FIG. 1 is an exemplary view showing a margin corresponding to a boundary between a tooth and a prosthesis.

Advantages and features of the present disclosure and methods of achieving them will be made clear from embodiments described in detail below with reference to the accompanying drawings. However, the present disclosure is not limited to embodiments disclosed below but will be implemented in various different forms, and only these embodiments are provided so that the disclosure of the present disclosure will be thorough and complete and will fully convey the scope of the present disclosure to those skilled in the art to which the present disclosure pertains, and the present disclosure is defined by the description of the claims. The same reference numerals refer to the same components throughout the specification.

In this specification, when a certain part "includes" a certain component, this means that other components may be further included other than excluding other components unless especially stated otherwise. As used herein, '~unit' is a unit that processes at least one function or operation, and may refer to, for example, software, FPGA, or hardware component. A function provided by '~unit' may be performed separately by a plurality of components, or may be integrated with other additional components. The term '~unit' in this specification is not necessarily limited to software or hardware, and may be configured to reside in an addressable storage medium, or may also be configured to reproduce one or more processors. Hereinafter, an embodiment of the present disclosure will be described in detail with reference to the drawings.

Figure 2:
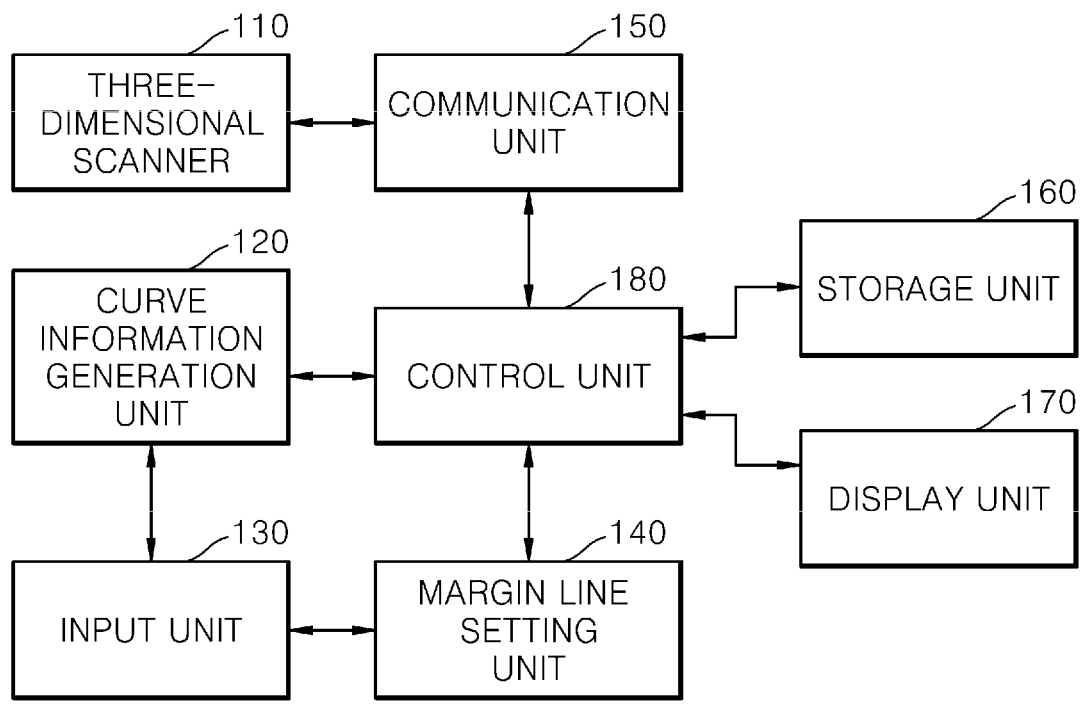
FIG. 2 is a configuration view of an apparatus for setting a margin line according to an embodiment of the present disclosure.

FIG. 2 is a configuration view of an apparatus for setting a margin line according to an embodiment of the present disclosure. Referring to FIG. 2, an apparatus 100 for setting a margin line according to an embodiment of the present disclosure may be provided to, for example, a medical terminal for prosthetic treatment. The medical terminal may be implemented as, for example, a desktop PC, a tablet PC, a laptop PC, a netbook computer, a smart phone, a workstation, a PDA, a PMP, or a wearable device, but is not limited thereto.

An apparatus 100 for setting the margin line according to an embodiment of the present disclosure may generate a three-dimensional virtual model for a preparation tooth with a three-dimensional scanner 110 (e.g., an oral scanner), and set a margin line based on data of a three-dimensional virtual model. A margin may mean the boundary between a tooth and a prosthesis (e.g., a crown), and the margin line may mean the outline of the corresponding margin.

Since the margin line is used as a basis for bonding when the prosthesis is coupled to the tooth, it is necessary to accurately set the margin line. For accurate and automatic setting of the margin line, the apparatus 100 for setting the margin line according to an embodiment of the present disclosure may include a three-dimensional scanner 110, a curve information generation unit 120, an input unit 130, a margin line setting unit 140, a communication unit 150, a storage unit 160, a display unit 170, and a control unit 180.

The three-dimensional scanner 110 is, for example, a trigonometry-based optical scanner or a confocal laser microscope-based scanner, and in some cases, may use an intraoral scanner configured to acquire three-dimensional data for the patient's oral cavity or an extraoral scanner configured to acquire three-dimensional data for an impression body of the tooth or a plaster model acquired with the impression body. The three-dimensional data acquired by the three-dimensional scanner 110 may be recorded in the form of a polygon mesh.

The curve information generation unit 120 may generate curve information on an surrounding area of a margin line candidate point selected from a three-dimensional virtual model acquired for a tooth using the three-dimensional scanner 110. In other words, curve information acquired by cutting three-dimensional scan data (three-dimensional virtual model) with respect to a cross section perpendicular to the tooth may be generated.

The input unit 130 may be provided as an interface unit for user input, such as inputting various commands such as setting and correcting (editing) a margin line, or selecting a margin line candidate point from the three-dimensional virtual model by a user such as a medical professional. The input unit 130 may include, for example, a predetermined input means such as a keyboard, a mouse, a touch pad, an electronic pen, a button or a switch, but is not limited thereto.

The margin line setting unit 140 may set a margin line representing the outline of the boundary between the tooth and the prosthesis based on the curve information of the tooth and the gum generated by the curve information generation unit 120. When one or more points (margin line candidate points) are selected from the three-dimensional virtual model, the margin line setting unit 140 ma select a portion with the greatest curve in the surrounding area of the selected point to determine a curve point, and set the margin line based on the curve point.

In an embodiment, the margin line setting unit 140 may determine the curve point as a position where an absolute value of a curvature has the maximum value in the area adjacent to the point selected from the three-dimensional virtual model by the user, and set the margin line based on the curve point.

The communication unit 150 may receive three-dimensional virtual model data from the three-dimensional scanner, and may be provided as various wired/wireless communication interfaces. The storage unit 160 may store the three-dimensional virtual model data, a program for setting the margin line from the three-dimensional virtual model, and other various information. The display unit 170 may display information such as the three-dimensional virtual model and the margin line set for the three-dimensional virtual model on a display screen.

The control unit 180 may control an operation of the apparatus for setting the margin line by applying various control commands for setting the margin line to the three-dimensional virtual model acquired for the tooth, and implement functions of setting/correcting/modifying/changing the margin line for the three-dimensional virtual model by executing the program for setting, correcting, and modifying (changing) the margin line. The control unit 180 may include at least one processor.

Figure 3:
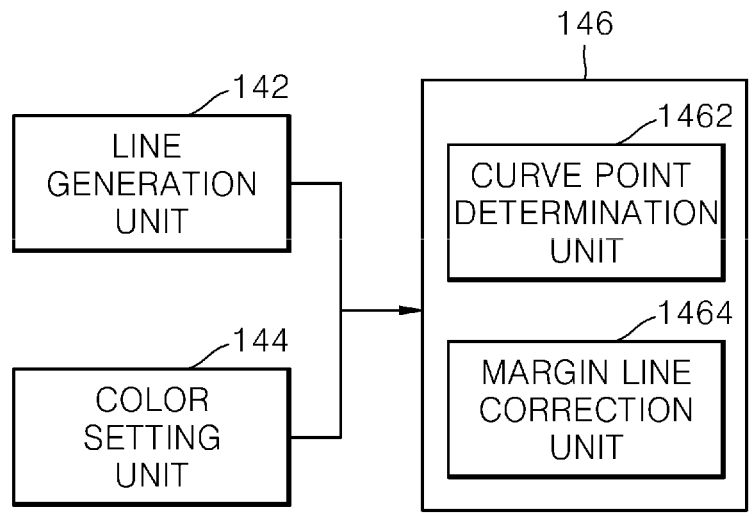
FIG. 3 is a configuration view of a margin line setting unit according to an embodiment of the present disclosure.

FIG. 3 is a configuration view of a margin line setting unit according to an embodiment of the present disclosure. Referring to FIGS. 2 and 3, the margin line setting unit 140 may include a line generation unit 142, a color setting unit 144, and a setting unit 146. The line generation unit 142 may generate a line (tooth line and gum line) corresponding to the cross-sectional outline of the tooth and gum of the three-dimensional virtual model from the curve line.

The color setting unit 144 may set the colors of the tooth line and the gum line based on color information included in points configuring a mesh of the three-dimensional virtual model or surfaces of the mesh. In an embodiment, the color information on the points configuring the mesh of the three-dimensional virtual model or the surfaces of the mesh may be acquired by using image information (two-dimensional image) generated by a camera. The two-dimensional image acquired by the camera includes texture information including color and the like, and the color information may be projected on the points configuring the mesh or the surfaces of the mesh by the corresponding information. The setting unit 146 may set the margin line based on the curve information of the line generated by the line generation unit 142 and the color information of the tooth line and the gum line set by the color setting unit 144.

The setting unit 146 may include a curve point determination unit 1462 and a margin line correction unit 1464. In an embodiment, the curve point determination unit 1462 may determine, as the curve point, the most curved portion in a partial range of points selected from the three-dimensional virtual model. The margin line correction unit 1464 may correct the margin line by determining the margin point based on the curve point determined by the curve point determination unit 1462 and color information of the lines representing the tooth and the gum.

Figure 4:
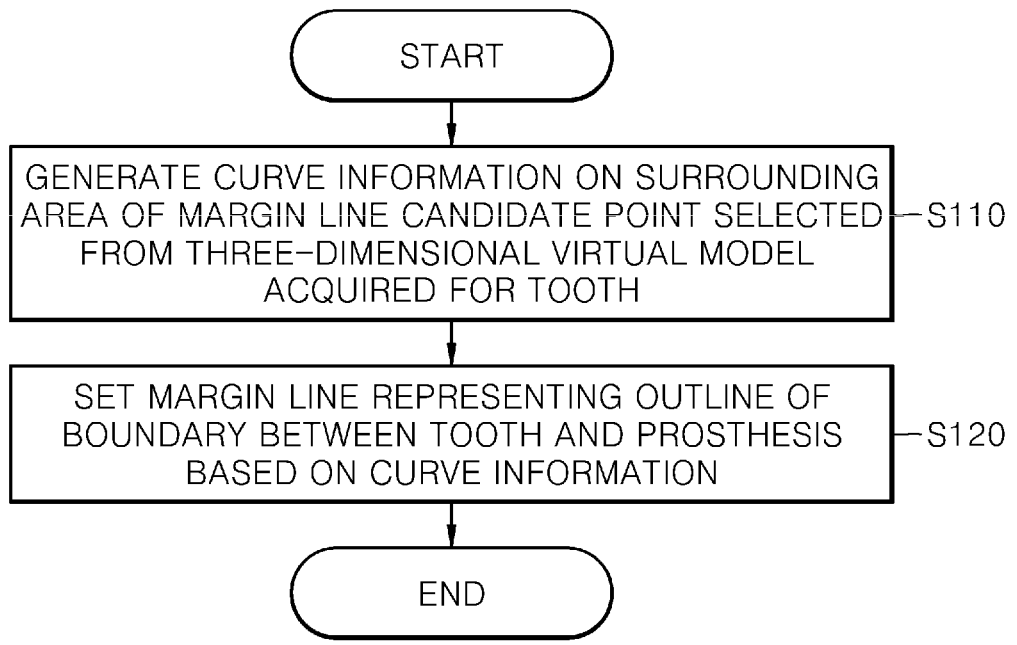
FIG. 4 is a flowchart of a method of setting a margin line according to an embodiment of the present disclosure.

FIG. 4 is a flowchart of a method of setting a margin line according to an embodiment of the present disclosure. Referring to FIGS. 2 and 4, the curve information generation unit 120 may generate curve information for the surrounding area of the margin line candidate point selected from the three-dimensional virtual model acquired for the tooth (S110). Accordingly, curve information acquired by cutting the three-dimensional scan data into a vertical cross section of the tooth may be generated.

The margin line setting unit 140 may set the margin line representing the outline of the boundary between the tooth and the prosthesis based on the curve information (S120). When one or more points are selected from the three-dimensional virtual model, the margin line setting unit 140 may set the margin line by selecting the portion with the greatest curve in a partial range of the selected point.

Figure 5:
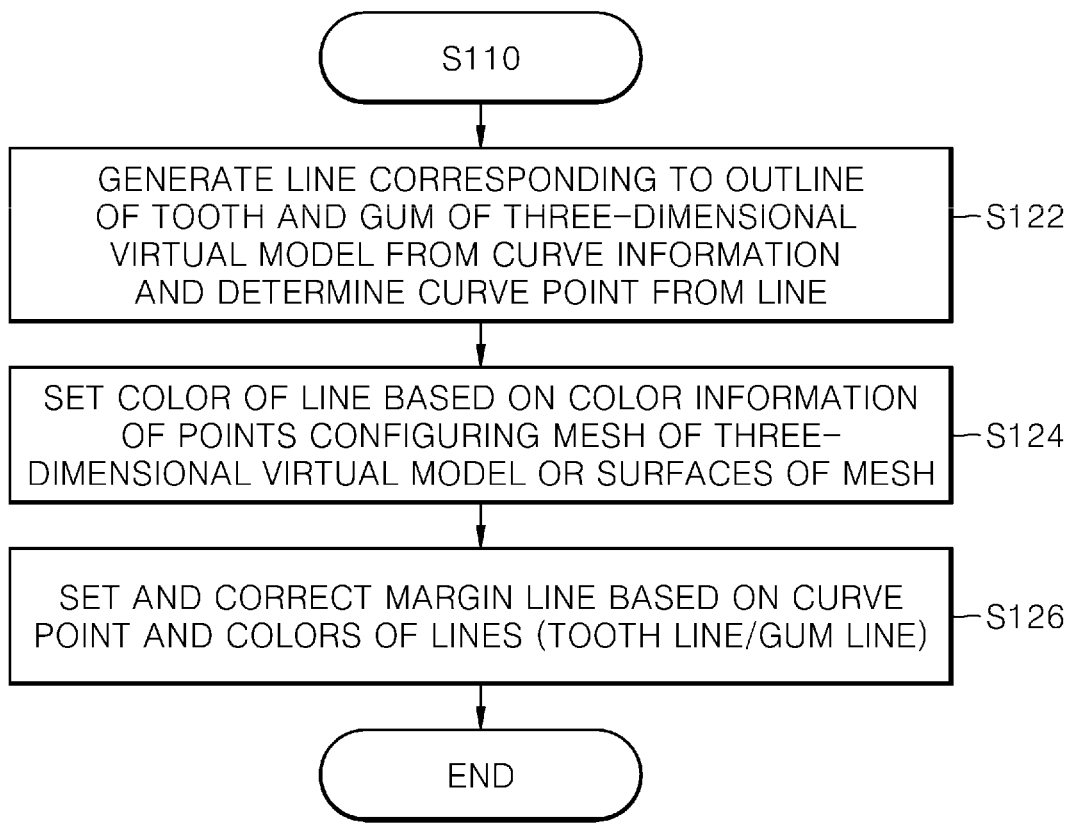
FIG. 5 is a flowchart of operation S120 in FIG. 3.

FIG. 5 is a flowchart of operation S120 in FIG. 4. Referring to FIGS. 2 to 5, the line generation unit 142 may generate a tooth line corresponding to the cross-sectional outline of the tooth of the three-dimensional virtual model from the curve information (S122). The color setting unit 144 may set the color of the tooth line based on the color information of the points configuring the mesh of the three-dimensional virtual model or the surfaces of the mesh (S124).

The setting unit 146 may set the margin line based on the curve information of the tooth and the gum corresponding to the area within a certain distance from the margin line candidate point (the point selected by the user) in a cross section of the tooth and the colors of the tooth line and the gum line (S126).

Figure 6:
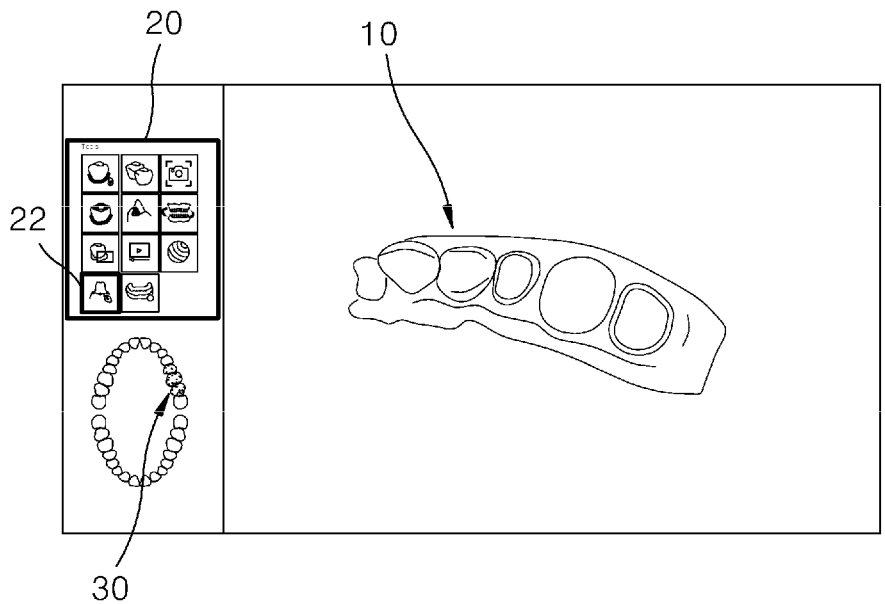
FIG. 6 is a view for describing operation S110 in FIG. 4, and an exemplary view of a three-dimensional virtual model and a user interface screen.
Figure 7:
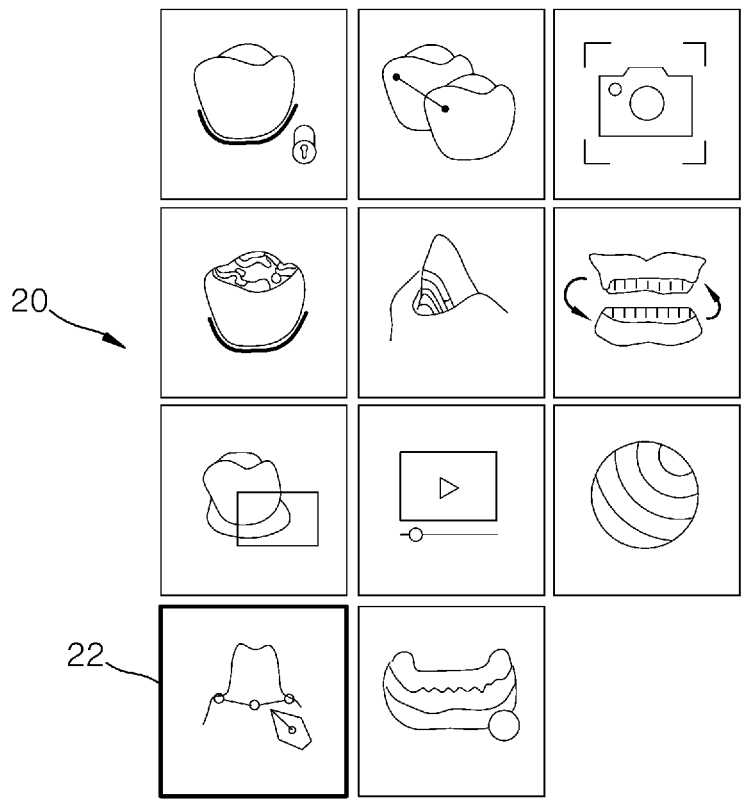
FIG. 7 is an enlarged view showing an object area in FIG. 6.
Figure 8:
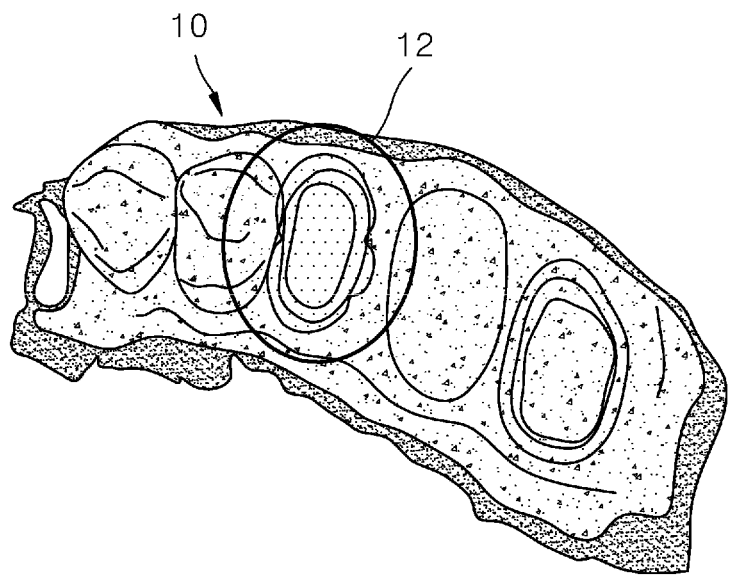
FIG. 8 is an exemplary view showing a target area for setting a margin line according to an embodiment of the present disclosure.

FIG. 6 is a view for describing operation S110 in FIG. 4, and an exemplary view of a three-dimensional virtual model and a user interface screen. FIG. 7 is an enlarged view showing the object area shown in FIG. 6. FIG. 8 is an exemplary view showing a target area for setting a margin line according to an embodiment of the present disclosure. Referring to FIGS. 2 and 3, and FIGS. 6 to 8, when the three-dimensional virtual model 10 is generated for the tooth and the gum, an area setting object 30 capable of designating an object area 20 including an object 22 (margin line drawing tool items) for setting the margin line for the three-dimensional virtual model 10 and a target area 12 for setting the margin line may be displayed on the user interface screen together with the three-dimensional virtual model 10.

When the medical professional inputs the target area (e.g., preparation tooth among the teeth) for setting the margin line of the three-dimensional virtual model 10 through the area setting object 30 using the input unit 130 such as a keyboard, a mouse, a touch pad, or an electronic pen, and then selects (e.g., clicks the mouse) the object 22, the program for setting the margin line automatically or semi-automatically for the set target area 12 may be executed.

Figure 9:
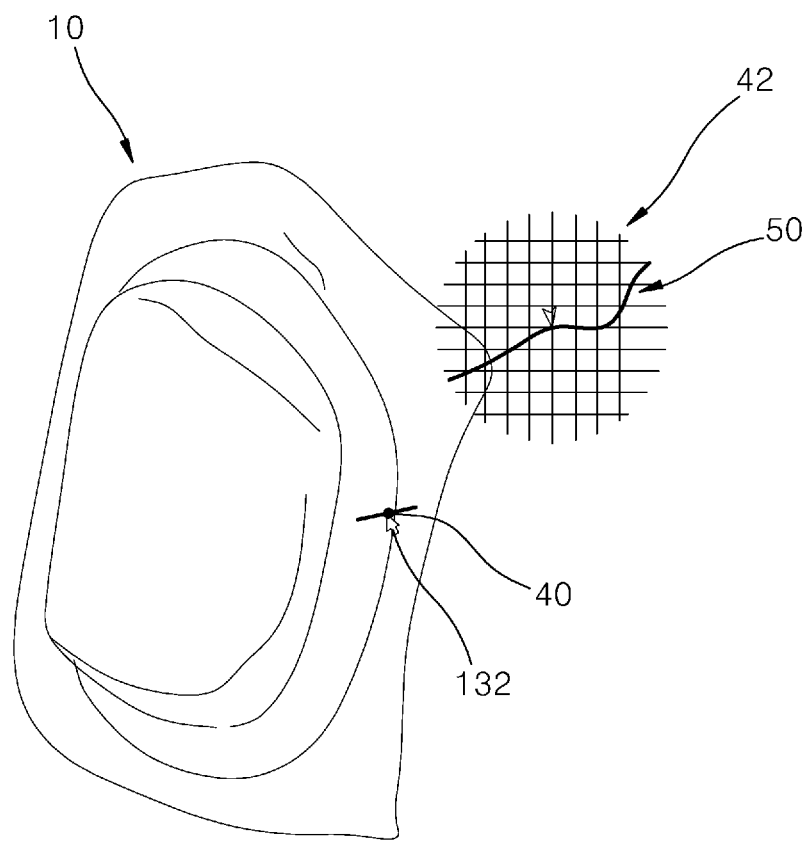
FIG. 9 is an exemplary view showing that a line corresponding to the outline between a tooth and a gum is generated according to an embodiment of the present disclosure.

FIG. 9 is an exemplary view showing that a line corresponding to the outline between a tooth and a gum is generated according to an embodiment of the present disclosure. Referring to FIGS. 2, 3, and 9, when the medical professional selects one or more points (margin line candidate point 40) from the three-dimensional virtual model 10 by moving a mouse point/cursor 132 using the input unit 130, the curve information generation unit 120 may generate curve information acquired by cutting the three-dimensional scan data vertically with respect to the surrounding area of the margin line candidate point 40 selected from the three-dimensional virtual model 10 acquired for the tooth.

The margin line setting unit 140 may set the margin line representing the outline of the boundary between the tooth and the prosthesis based on the curve information and display the margin line on an enlarged area 42 together with the three-dimensional virtual model 10. The enlarged area 42 may represent the tooth and the gum lines (curve shape) generated when the corresponding tooth is cut in a vertical cross section in the form of grid coordinate.

When one or more margin line candidate points 40 are selected from the three-dimensional virtual model 10, the margin line setting unit 140 may set the margin line by selecting the most curved portion in a partial range of the selected margin line candidate points 40. To this end, first, the line generation unit 142 may generate a line 50 corresponding to the cross-sectional outline of the tooth and gum of the three-dimensional virtual model 10 from the curve information.

Figure 10:
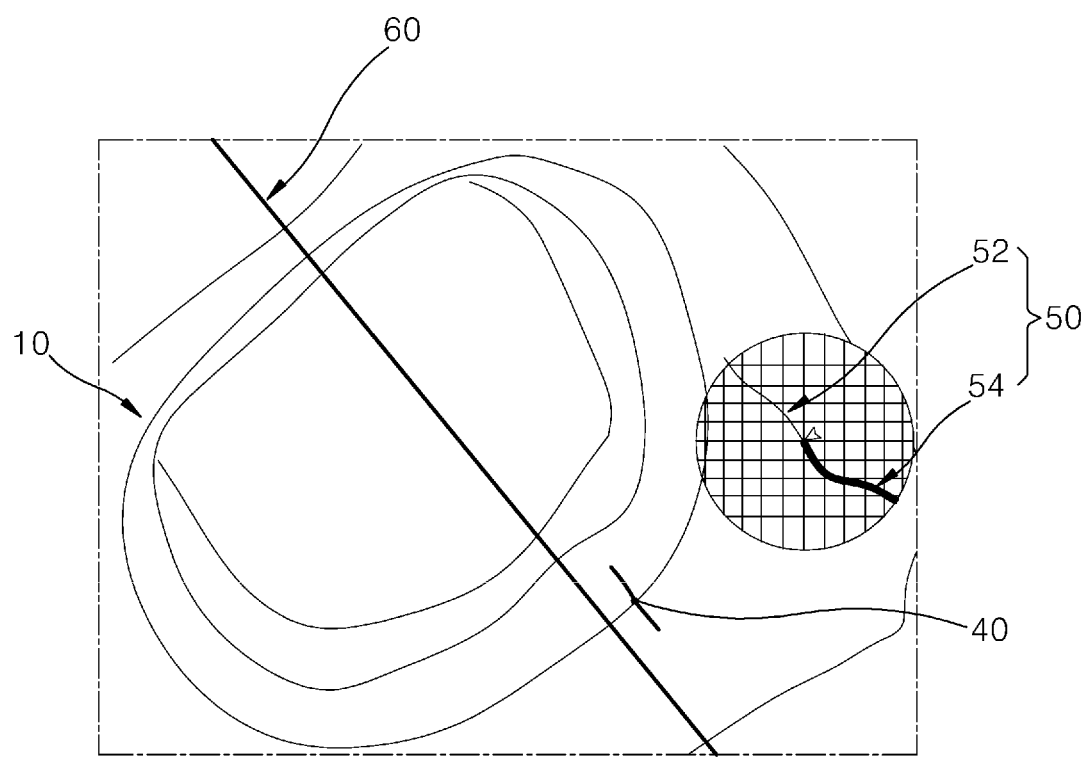
FIG. 10 is an exemplary view showing that colors are added to the tooth and gum lines according to an embodiment of the present disclosure.
Figure 11:
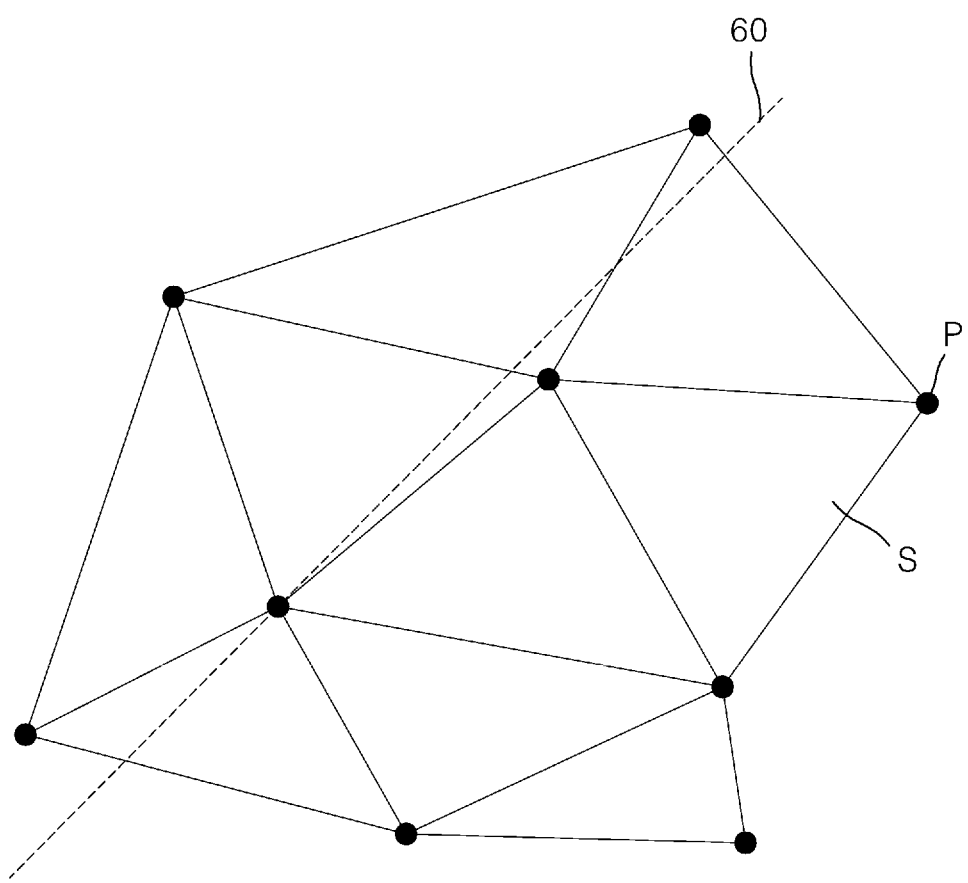
FIG. 11 is a view showing a method of adding the colors to the tooth and gum lines according to an embodiment of the present disclosure.

FIG. 10 is an exemplary view showing that colors are added to the tooth and gum lines according to an embodiment of the present disclosure. FIG. 11 is a view showing a method of adding the colors to the tooth and gum lines according to an embodiment of the present disclosure. Referring to FIGS. 2, 3, 10, and 11, the lines 50 of the tooth and the gum represent curve information taken along a vertical plane 60.

The color setting unit 144 may set the colors of the lines 50 representing the tooth and the gum based on the color information of points P configuring the mesh of the three-dimensional virtual model or surfaces S of the mesh. In an embodiment, the color information on the points P configuring the mesh of the three-dimensional virtual model or the surfaces S of the mesh may be acquired by using the image information (two-dimensional image) generated by the camera. The two-dimensional image acquired by the camera includes texture information including color and the like, and the color information may be projected on the points configuring the mesh or the surfaces of the mesh by the corresponding information. Accordingly, the color of the line 50 may be aligned through the color information of the mesh. In FIG. 10, a tooth line 52 representing a tooth is shown in a first color (e.g., white), and a gum line 54 representing a gum is shown in a second color (e.g., red).

The setting unit 146 may set the margin line based on the curve information and the colors of the tooth/gum lines 52 and 54. The curve point determination unit 1462 may determine a portion (point) with the greatest curve in a partial range of the points selected in the three-dimensional virtual model as the curve point.

The margin line correction unit 1464 may correct the margin line by determining the margin point based on the curve point determined by the curve point determination unit 1462 and the color information of the lines 50 representing the tooth and the gum. When at least a part of the margin line is set on the gum line 54, the prosthesis is not bonded to the tooth in the corresponding portion, so that the bonding force between the tooth and the prosthesis may be reduced.

To increase the bonding force between the tooth and the prosthesis, the margin line needs to be set on the tooth line 52. To this end, when the curve point is positioned on the gum line 54, the margin line correction unit 1464 may correct the position of the margin point from the curve point to a position on the tooth line 52. At this time, the margin line correction unit 1464 may determine a point with the greatest curve in the area on the tooth line 52 set adjacent to the gum line 54 as the margin point to correct the margin line based on the corresponding margin point.

One or a plurality of margin points may be determined. When the plurality of margin points are determined, the margin line connecting the plurality of margin points may be generated. In addition, in a state in which only one margin point is determined, the margin line may also be generated by connecting the points with the greatest curve within the set range based on the curve information in a circumferential direction of the tooth including the corresponding margin point.

Figure 12:
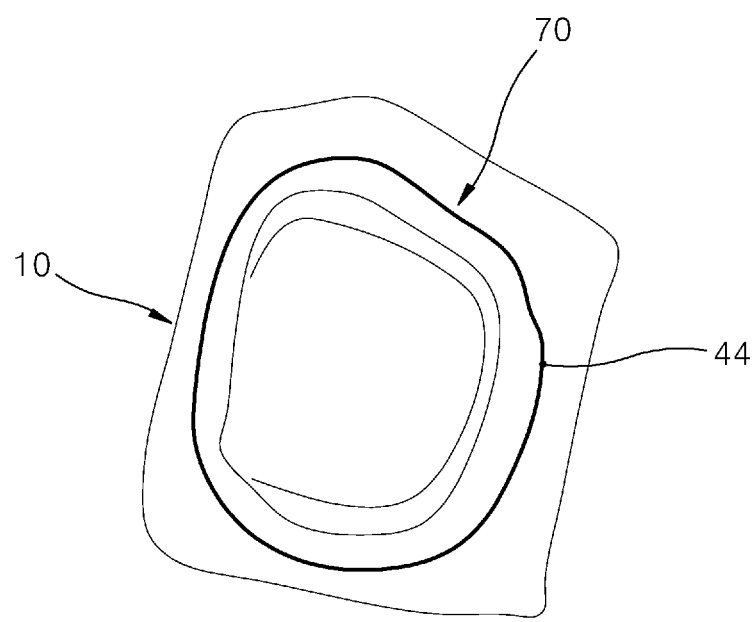
FIG. 12 is a view showing a set margin line according to an embodiment of the present disclosure.
Figure 13:
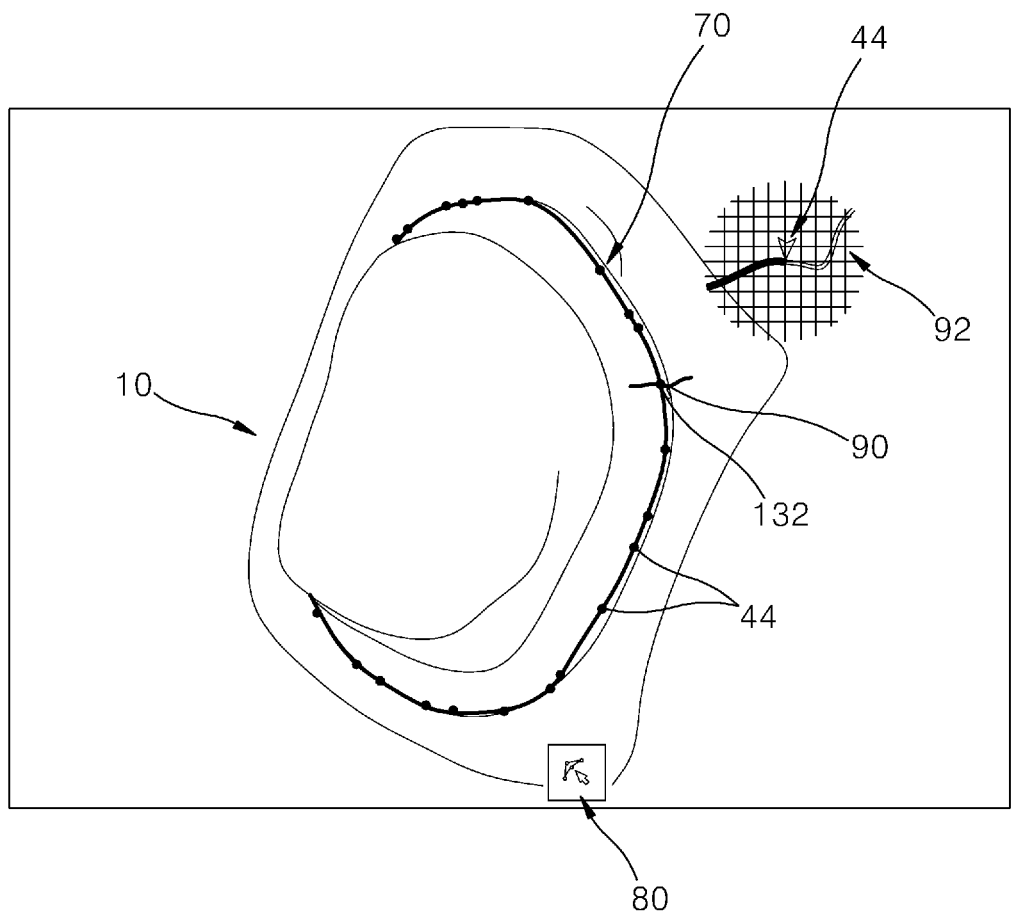
FIG. 13 is an exemplary view showing that the margin line is corrected and edited according to an embodiment of the present disclosure.

FIG. 12 is a view showing a set margin line according to an embodiment of the present disclosure. FIG. 13 is an exemplary view showing that the margin line is corrected and edited according to an embodiment of the present disclosure. Referring to FIGS. 1, 12, and 13, a margin line 70 set for the preparation tooth of the three-dimensional virtual model 10 may be displayed, and at the same time, a generation/modification object 80 for generating/modifying the margin line 70 may be displayed on the user interface screen by the display unit 170.

When the medical professional selects the generation/modification object 80 using the input unit 130, the input unit 130 may convert the margin line 70 into a state of being able to be generated/modified. For example, when the medical professional selects (e.g., clicks the mouse) a margin point 90 to be generated/modified among margin points 44 on the margin line 70 by moving the mouse point/cursor 132 of the input unit 130 on the user interface screen, the margin line 70 may be generated/modified in an surrounding area of the selected corresponding margin point 90.

At this time, a line 92 representing the curve information of the surrounding area of the margin point 90 selected by the medical professional is displayed on the user interface screen so that the medical professional may adjust the margin line 70 with reference to the curve information of the line 92. In other words, the margin line setting unit 140 may generate the line representing the curve information of the surrounding area of the margin point 90 based on the curve information of the three-dimensional virtual model 10 so that the medical professional may refer to the curve information of the line 92 for the generation/correction of the margin line. The curved line around the margin point 90 generated by the margin line setting unit 140 may be displayed by the display unit 170 together with the three-dimensional virtual model 10.

When the margin line setting unit 140 selects the generation/modification object 80, the margin line setting unit 140 may move the position of the margin point 90 to the surrounding area on the margin line 70 according to the operation of the input unit 130, and modify the margin line 70 based on the moved position of the margin point 90. At this time, the margin point 90 and the margin line 70 may be adjusted by, for example, a mouse drag direction, the input of a keyboard direction key, or the like.

According to the embodiment of the present disclosure as described above, it is possible to set the margin line corresponding to the outline of the boundary between the tooth and the prosthesis based on the three-dimensional virtual model data of the tooth acquired by the three-dimensional scanner such as an oral scanner. Accordingly, by bonding the tooth and the prosthesis through an accurate setting of the margin line, it is possible to increase the bonding force between the tooth and the prosthesis by preventing a gap (hole) from occurring in the bonding process of the tooth and the prosthesis, and prevent caries from occurring due to the penetration of saliva or impurities into the gap between the tooth and prosthesis.

In addition, according to an embodiment of the present disclosure, by primarily generating the margin line based on the curve information of the tooth and the gum, and secondarily correcting the portion of the margin line that needs to be supplemented based on the color information of the tooth and the gum, it is possible to generate a more accurate margin line, and prevent the bonding force between the tooth and the prosthesis from being degraded by preventing the margin line from being incorrectly set on the gum.

Meanwhile, while an example in which the margin line is primarily generated based on the curve information of the tooth and the gum, and secondarily the portion of the margin line that needs to be supplemented is corrected based on the color information of the tooth and the gum has been described in the above-described embodiment, when the line corresponding to the outline of the tooth and the gum of the three-dimensional virtual model is generated, it is also possible to use the curve information of the tooth and the gum and the color information of the three-dimensional virtual model together.

In other words, the margin line may be generated by using the curve information and the color information together in the operation of primarily generating the margin line using the curve information of the tooth and the gum, and secondarily generating the margin line without correcting the margin line based on the color information.

Specifically, the curve information generation unit 120 may generate the curve information for the surrounding area of the margin line candidate point selected from the three-dimensional virtual model acquired for the tooth using the three-dimensional scanner 110, and the color setting unit 144 may set the colors of the tooth line and the gum line based on the color information included in the points configuring the mesh of the three-dimensional virtual model or the surfaces of the mesh.

The line generation unit 142 may generate the line (tooth line and gum line) corresponding to the cross-sectional outline of the tooth and the gum of the three-dimensional virtual model based on the curve information acquired from the curve information generation unit 120 and the colors of the tooth line and the gum line acquired by the color setting unit 144. Accordingly, by reflecting the color information as well as the curve information together in the operation of generating the line by the line generation unit 142, it is possible to omit the operation of correcting the margin line generated by using the curve information based on the color information as in the above-described embodiment.

The above-described embodiments may be implemented by a hardware component, a software component, and/or a combination of the hardware component and the software component. For example, the apparatus, method, and component described in the embodiments may be implemented by using one or more general purpose or special purpose computers, for example, such as a processor, a controller, an arithmetic logic unit (ALU), a digital signal processor, a microcomputer, a field programmable gate array (FPGA), a programmable logic unit (PLU), a microprocessor, or any other device capable of executing and responding to instructions.

The processing device may run an operating system and one or more software applications running on the operating system. The processing device may also access, store, operate, process, and generate data in response to the execution of the software. For convenience of understanding, a single processing device is sometimes described as being used, but those skilled in the art will understand that the processing device includes a plurality of processing elements and/or a plurality of types of processing elements.

For example, the processing device may include a plurality of processors or one processor and one controller. Other processing configurations are also possible, such as a parallel processor. The software may include a computer program, codes, instructions, or a combination of one or more thereof, and may configure the processing device to operate as desired or command the processing device independently or collectively.

The software and/or data may be embodied in any kind of machine, component, physical device, virtual equipment, computer storage medium or device, or a transmitted signal wave permanently or temporarily to be interpreted by the processing device or to provide instructions or data to the processing device. The software may be distributed over networked computer systems and also stored or executed in a distributed manner. The software and the data may be stored in one or more computer-readable recording media.

The method according to the embodiment may be implemented in the form of program instructions that may be executed through various computer means and recorded in a computer-readable medium. The computer-readable medium may include program instructions, data files, data structures, or the like alone or in combination. The program instructions recorded in the medium may be specially designed and configured for the embodiment, or may be known and available to those skilled in the art of computer software.

Examples of the computer-readable recording medium include magnetic media such as a hard disk, a floppy disk, and a magnetic tape, optical media such as a CDROM and a DVD, and a hardware device specially configured to store and execute the program instructions such as ROM, RAM, or flash memory. Examples of the program instructions include not only machine language codes such as those generated by a compiler, but also high-level language codes that may be executed by a computer using an interpreter or the like. The above-described hardware devices may be configured to operate as one or more software modules to perform the operations of the embodiments, and vice versa.

As described above, although the embodiments have been described with reference to the limited embodiments and drawings, various modifications and changes are possible from the above description by those skilled in the art. For example, even when the described techniques are performed in an order different from the described method, and/or the described components of the system, structure, apparatus, circuit, and the like are coupled or combined in the form different from the described method, or replaced or substituted with other components or equivalents, it is possible to achieve an appropriate result. Accordingly, other implementations, other embodiments, and equivalents to the claims also belong to the scope of the appended claims.

INDUSTRIAL APPLICABILITY

The present disclosure is to provide the apparatus and method for setting the margin line, and the recording medium, in which the apparatus and method for setting the margin line corresponding to the outline of the boundary between the tooth and the prosthesis based on three-dimensional virtual model data of the tooth acquired by the three-dimensional scanner such as an oral scanner.

The invention claimed is:

1. A method for setting a margin line, the method comprising:
   generating curve information on a surrounding area of a margin line candidate point selected from a three-dimensional virtual model acquired for a tooth; and
   setting a margin line representing the outline of a boundary between the tooth and a prosthesis based on the curve information,
   wherein the setting a margin line comprises:
   generating a line corresponding to a cross-sectional outline of the tooth and gum of the three-dimensional virtual model from the curve information;
   setting a color of a line including a tooth line having a color of the tooth and a gum line having a color of the gum, using color information of the three-dimensional virtual model; and
   setting the margin line based on the curve information and the color of the tooth line and the color of the gum line.

2. The method of claim 1,
   wherein the setting of the color of the line sets the color of the line based on color information of points configuring a mesh of the three-dimensional virtual model or surfaces of the mesh.

3. The method of claim 1,
   wherein the setting of the margin line includes:
   selecting a portion with the greatest curve in the surrounding area of the margin line candidate point as a curve point; and
   correcting the margin line by determining a margin point based on the curve point and the color information of the line representing the tooth and the gum.

4. The method of claim 3,
   wherein the correcting of the margin line includes correcting a position of the margin point from the curve point to a position on a tooth line representing the tooth when the curve point is positioned on a gum line representing the gum.

5. The method of claim 4,
   wherein the correcting of the margin line includes correcting the margin line by determining a point with the greatest curve on the tooth line as the margin point.

6. The method of claim 1, further comprising:
displaying a generation/correction object for generating or correcting a preparation tooth of the three-dimensional virtual model and the margin line of the preparation tooth;
converting the margin line into a state in which generation or correction is possible when the generation/correction object is selected;
displaying a line representing curve information of a surrounding area of the margin point selected by an input unit together with the three-dimensional virtual model;
moving a position of the margin point to the surrounding area on the margin line by the input unit; and
correcting the margin line based on the moved position of the margin point.

7. The method of claim 6,
wherein the displaying of the line includes applying color information of the tooth and a gum to the curve information of the surrounding area of the margin point.

8. An apparatus for setting a margin line, the apparatus comprising:
a curve information generation unit configured to generate curve information for a surrounding area of a margin line candidate point selected from a three-dimensional virtual model acquired for a tooth; and
a margin line setting unit configured to set a margin line representing the outline of a boundary between the tooth and a prosthesis based on the curve information,
wherein the margin line setting unit includes:
a line generation unit configured to generate a line corresponding to a cross-sectional outline of the tooth and gum of the three-dimensional virtual model from the curve information:
a color setting unit configured to set a color of a line including a tooth line having a color of the tooth and a gum line having a color of the gum, using color information of the three-dimensional virtual model; and
a setting unit configured to set the margin line based on the curve information and the color of the tooth line and the color of the gum line.

9. The apparatus of claim 8,
wherein the color setting unit sets the color of the line based on color information of points configuring a mesh of the three-dimensional virtual model or surfaces of the mesh.

10. The apparatus of claim 9,
wherein the setting unit includes:
a curve point selection unit configured to select a portion with the greatest curve in the surrounding area of the margin line candidate point as a curve point; and
a margin line correction unit configured to correct the margin line by determining a margin point based on the curve point and the color information of the line representing the tooth and the gum.

11. The apparatus of claim 10,
wherein the margin line correction unit corrects a position of the margin point from the curve point to a position on a tooth line representing the tooth when the curve point is positioned on a gum line representing the gum.

12. The apparatus of claim 11,
wherein the margin line correction unit corrects the margin line by determining a point with the greatest curve on the tooth line as the margin point.

13. The apparatus of claim 8, further comprising:
a display unit configured to display a generation/correction object for generating or correcting a preparation tooth of the three-dimensional virtual model and a margin line of the preparation tooth; and
an input unit provided to select the generation/correction object and the margin point on the margin line,
wherein the curve information generation unit generates a line representing curve information of a surrounding area of the margin point, and
the display unit displays the line representing the curve information of the surrounding area of the margin point together with the three-dimensional virtual model.

14. The apparatus of claim 13,
wherein the margin line setting unit converts the margin line to a state in which generation or correction is possible when the generation/correction object is selected,
moves a position of the margin point on the margin line to the surrounding area according to an operation of the input unit, and
corrects the margin line based on the moved position of the margin point.

15. The apparatus of claim 13,
wherein the curve information generation unit applies color information of the tooth and the gum to the curve information of the surrounding area of the margin point.

\* \* \* \* \*